Patented Jan. 7, 1941

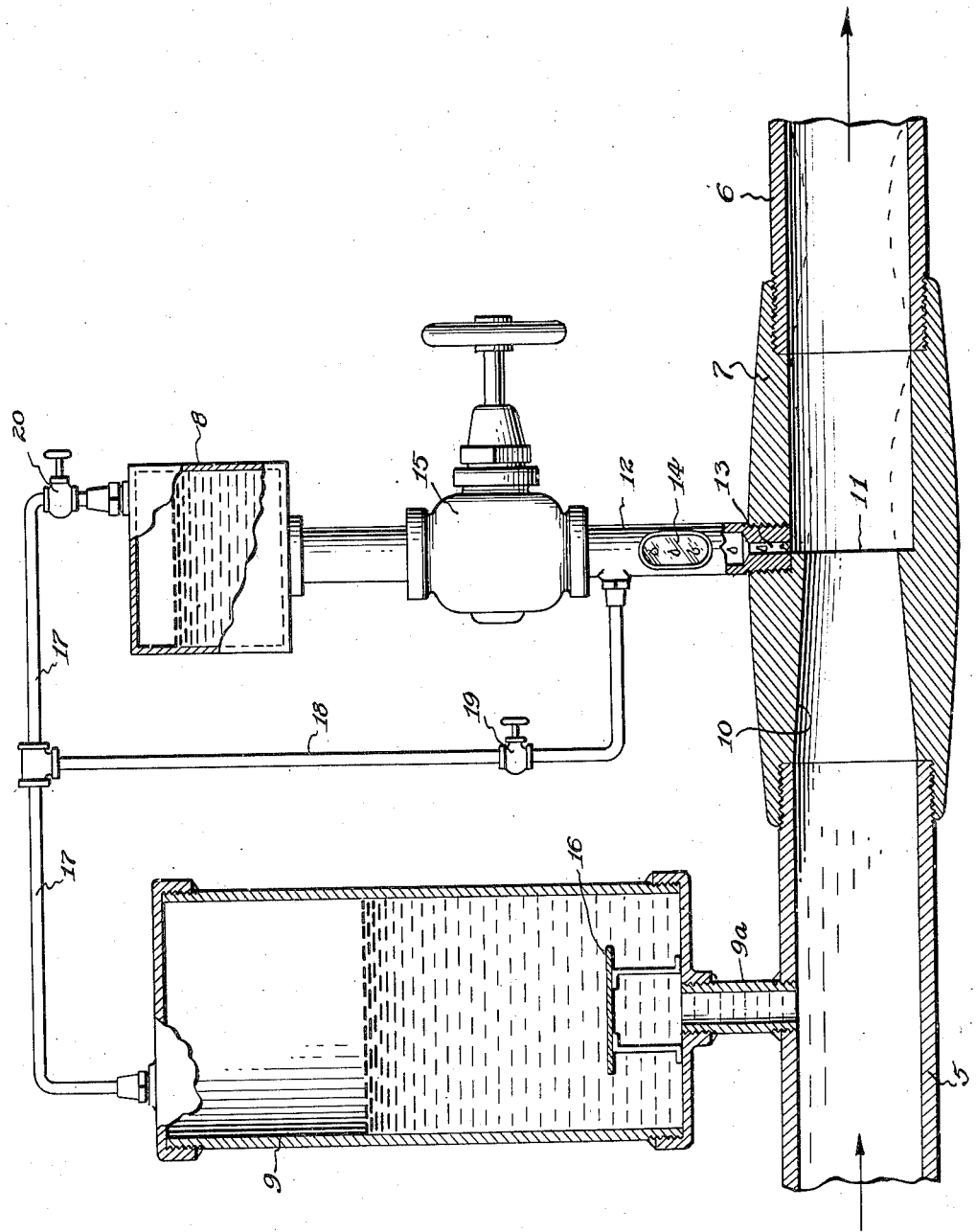

2,227,646

UNITED STATES PATENT OFFICE 2,227,646

LIQUID MIXING SYSTEM

Max G. Hillmann, Detroit, Mich.

Application December 8, 1937, Serial No. 178,782

3 Claims. (Cl. 299—84)

This invention relates to a liquid mixing system and has particularly to do with a control apparatus for a combined sprinkler and mixer for water and liquid fertilizer.

Specifically the invention is concerned with apparatus intended to introduce fertilizer into a stream of water whereby the water may be sprayed on flowers, grass and other growing plants for the purpose of watering and fertilizing the same. The invention may also be used to correct extreme acid or basic conditions in sprinkling water.

Previous practice has been to introduce the fertilizer into the water stream in a dissolved state or in liquid form by connecting a supply tank of said fertilizer into the water pipe and adjusting a control valve to regulate the amount of liquid fertilizer to be introduced into the water stream. This practice has proved unsatisfactory in that sudden fluctuations in the pressure of the water stream have caused fertilizer to be introduced too rapidly into the water stream with the result that certain parts of the plants or lawn being watered would be subjected to burns because of contact with highly concentrated mixtures of water and fertilizer. Furthermore, when fine spray nozzles were used to distribute the mixture, pressure building up in the supply pipe would back up into the fertilizer tank and entirely prevent mixing.

The object of the present invention is to provide an apparatus for controlling the mixture of water and fertilizer whereby a steady regulatable quantity of fertilizer may be introduced into the water stream regardless of the pressure conditions or the pressure surges in the water supply pipe.

Briefly, the invention is accomplished by providing a venturi at the point in the water pipe where the fertilizer is to be introduced and by connecting a pressure head tank between the water pipe behind the venturi and the surface of the liquid fertilizer and locating a needle valve between the water stream and the fertilizer supply pipe. An illustration of one modification of the invention is set forth in the following description and accompanying drawing.

In the drawing:

The single figure is a partially diagrammatic view of the mixer.

In the drawing, a pipe line 5 leading from a water supply is shown connected to a pipe line 6 which leads to an outlet spray (not shown). The pipe lines 5 and 6 are connected by venturi 7 into which is tapped a connection from a liquid fertilizer tank 8. A pressure head tank 9 is tapped into the pressure line 5 and is connected to the liquid fertilizer tank in a manner which will be hereinafter described.

The venturi 7 consists of a normal straight pipe connection having a converging portion 10 terminating at the restriction 11 which is located at about the center portion of the connection. The restriction 11 is preferably designed to equal the smallest pipe size between the pressure source and the venturi.

The connection between the liquid fertilizer tank 8 and the venturi 7 consists of a small pipe 12 which is provided with a restricted opening 13 at its lower end. This pipe 12 is connected into the mid-portion of the venturi 7 in such manner that the restricted opening 13 is positioned just ahead of the restricted opening 11. The pipe 12 is also provided with a visible sight feed 14 which may consist of an opening in the pipe sealed with a glass cover. The upper end of the pipe 12 is connected into an adjustable needle valve 15 which is preferably provided with a stainless steel needle (not shown) to avoid corrosion. The needle valve is, in turn, connected to the lower portion of the liquid fertilizer tank 8.

The pressure head tank 9 consists of an ordinary water tank and is provided with an opening at its lower portion which is connected to the water supply pipe 5 by a pipe 9a. A baffle plate 16 is preferably provided to cover the opening in the lower portion of the tank to prevent the water from the supply pipe 5 from spouting to the top portion of the tank. The pressure head tank 9 is so dimensioned in relation to the pressures to be carried by the supply pipes that there will be a considerable body of compressed air in the top portion of the tank during the operation of the device. The volume of compressed air in the pressure head tank 9 is preferably at least twice as great as the total volume of fertilizer or softener container in tank 8. This removes all danger of water flowing from tank 9 into tank 8 to change the specific gravity of the fertilizer or to soften and prevent proper correction of water as originally adjusted. After all the fertilizer or other substance has been used up from tank 8 and not replenished, the compressed air simply blows out into pipe 6 and no harm is done by water which might pass up through the connecting pipe. A pipe 17 connects the top portions of the tank 9 and the tank 8. This pipe 17 is also connected through a pipe 18 and valve 19 to the pipe 12. A bleeder pet cock 20 is preferably provided in the pipe 17 near the fertilizer tank 8.

The apparatus above described provides what may be called an air balancing system for liquid mixers. In the operation: The liquid fertilizer tank 8 is filled with some type of liquid fertilizer as, for example, phosphoric acid or ammonium sulphate, depending on the soil condition, and the needle valve 15 is adjusted so that the desired number of drops will be admitted from the fertilizer tank to the pipe 12. The rate at which the drops are falling may be observed through the visible sight feed 14. The water may then be turned into the pipe line 5 by a suitable valve and the converging venturi 7 will serve to create a vacuum at the opening 13 thereby drawing any liquid in the pipe 12 into the water stream. Due to the fact that a certain pressure will be maintained in the pipe 5, water will be forced into the tank 9 thereby partially filling the tank and compressing the air in the upper portion thereof. The pressure created by this compressed air will be conducted through the pipe 17 to the air space in the top portion of the liquid fertilizer tank 8. With this arrangement, in case there would be any restriction in the outlet pipe 6, such as is caused by admitting the water in the outlet to a fine spray (not shown), the pressure which will build up in the pipe 5 will be transmitted to the surface of the liquid fertilizer in the tank 8, thereby maintaining the flow of liquid fertilizer through the needle valve at the rate for which the needle valve was first adjusted. The needle valve must be adjusted to maximum pressure after which the feeding of fertilizer is in proportion to the amount of water flowing through the pipes at lower pressures. Were it not for this air balancing arrangement any undue pressure in the pipes 5 and 6 would cause water to back up through the opening 13 into the pipe 12. The opening 13 is preferably a small opening to further counteract this backing up.

The pipe 18 and the valve 19 are provided so that in case water has backed up into the pipe 12, the valve 19 may be opened to clear out this water and permit an adjustment of the needle valve 15. For example, in case the outlet spray was entirely closed, by accident or by design, as for example, when the liquid fertilizer tank is being replenished, then the valve 19 could be opened to clear out the visible sight feed 14 to permit the regulated flow of liquid fertilizer to continue through the pipe 12 and opening 13. With the apparatus as described, it is unnecessary to change the size of the venturi each time the character of the spray is changed. Furthermore, fluctuations in pressure due to the turning on or off of other faucets in the system will not affect the steady flow of fertilizer into the water stream.

In case of a large unit, a number of needle valves and sight feeds may be provided to avoid the necessity of having a stream of liquid fertilizer. With a number of valves the mixing could be accurately controlled by counting the drops in each one. The metal portions of the apparatus will, of course, be formed of non-corrosive materials.

A feature of the invention which should be emphasized is that the fertilizing drops enter the supply pipe just beyond the venturi restriction. At this point the drops enter the swirling portion of the water and are completely diffused with the water supply.

I have found, in actual use of the unit, that by using phosphoric acid as a fertilizer distinctly desirable results are obtained. This acid removes any scale that may have collected in the pipes and forms a protective rustproof film on the inside of the pipes so that the building up of new scale is prevented. Furthermore, this acid is an excellent neutralizer for the water supply.

I claim:

1. In a pipe line for carrying a water supply, a liquid mixing apparatus comprising a venturi restriction in the line, said restriction ending abruptly at a shoulder, a reservoir for holding liquid to be mixed, a pipe connection between said reservoir and said venturi, an adjustable valve in said connection, and a pressure head tank connected to the pipe line and to said reservoir.

2. In a pipe line for carrying a water supply for sprinkling, a fertilizer mixing apparatus comprising a converging venturi restriction in the line, a liquid fertilizer tank, a connection between the fertilizer tank and that portion of the line directly adjacent said restriction, an adjustable valve and a visible feed indicator in said connection, a pressure head tank connected at the lower end to the pipe line behind the venturi restriction, and connections between the top of said pressure head tank and the top of said fertilizer tank and between the top of said pressure head tank and visible feed indicator, whereby air under pressure may be admitted to said indicator to clear the same of liquid.

3. In a pipe line for carrying a water supply, a mixing apparatus comprising a converging venturi restriction in the line, a tank for liquid to be mixed, a feed connection between said tank and that portion of the line directly adjacent said venturi restriction, means to provide for regulation of flow from said tank to said restriction, a pressure head cylinder open at one end to the pipe line behind the venturi restriction, and connections between the other end of said pressure head cylinder and the top of said tank and the feed connection whereby air under pressure may be admitted to said feed connection to clear the same of liquid.

MAX G. HILLMANN.